Figure 1:
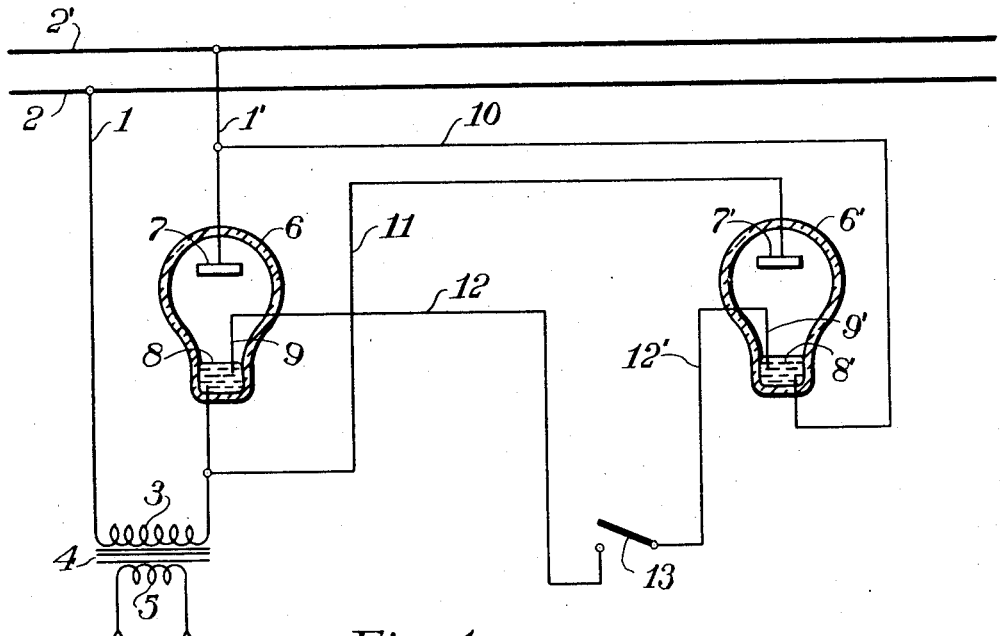

July 11, 1939.   J. SLEPIAN   2,165,911

CURRENT CONTROL SYSTEM

Filed March 5, 1938

WITNESSES:
Edward Michaels
T. L. Bartholf

INVENTOR
Joseph Slepian.
BY
F. W. Lyle.
ATTORNEY

Patented July 11, 1939

2,165,911

UNITED STATES PATENT OFFICE 2,165,911

CURRENT CONTROL SYSTEM

Joseph Slepian, Pittsburgh, Pa., assignor to Westinghouse Electric & Manufacturing Company, East Pittsburgh, Pa., a corporation of Pennsylvania Application March 5, 1938, Serial No. 194,133

12 Claims. (Cl. 250—27)

This invention relates to current control systems, and more particularly to systems employing vapor-arc rectifiers of the "Ignitron" type for controlling a flow of current in an alternating current supply line.

Under the term "ignitron" or "vectrion" is to be understood here the type of vapor-arc rectifier having two main electrodes in the form of a cold cathode and an anode, and an auxiliary starting electrode known as the starting, or make-alive electrode, which functions in such manner as to neutralize the cathode reluctance by creating a cathode-spot and thereby initiating the formation of an arc discharge between the main electrodes when the cathode is negative with respect to the anode. Rectifiers of the type above mentioned are well known in the art and have been extensively described by the inventor herein named, for instance in United States Patent No. 2,069,283 and in publications such as the Electrical Journal, June, 1936, pages 267–272.

An object of this invention is to utilize the advantageous low-loss current conductive properties of ignitron rectifiers and the control facilities provided by the ignitron-electrode in a simple circuit arrangement for controlling at will the duration of flow of current in an alternating current supply line.

A further object of this invention is to control comparatively large currents in a primary circuit between an alternating current supply and a load therefor, by means of controlling the flow of comparatively small currents in a secondary circuit.

A particular feature of this invention is that by the novel circuit arrangement herein disclosed all auxiliary apparatus for the proper excitation of the make-alive electrode may be entirely dispensed with. Such apparatus usually includes thermionic or dry rectifiers, or grid-glow tubes connected to the starting electrode in such manner that a positive current impulse be given to it in proper phase relation with the potential difference existing between the main electrodes. Especially for current control use in welding applications when two rectifiers are connected in dua-lateral relation of conductivity—such connection often referred to in technical parlance as back-to-back—the auxiliary apparatus also includes timing and selector devices for controlling the conductance of the rectifiers in proper time and phase. In the publication referred to, such an arrangement is schematically indicated. The circuit arrangement of the present invention permits the elimination of such selecting and timing devices with equal efficiency in operation and added simplicity of structure.

Other features and advantages will become evident from the following description of the invention defined in particularity in the appended claims, taken in connection with the accompanying drawing wherein identical reference characters in the two figures denote corresponding elements.

Figure 2:
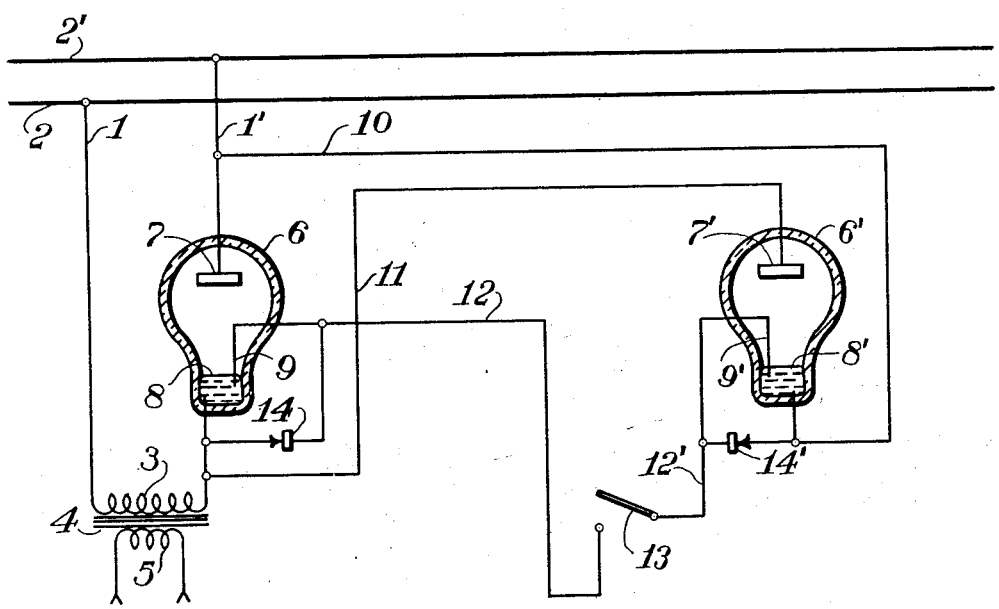

In the drawing:

Figure 1 shows a circuit arrangement utilizing a pair of ignitron rectifiers in back-to-back connection serially interposed between a supply line and a load, and Fig. 2 is a modification of the circuit of Fig. 1, including means for diverting the flow of back-current.

Referring to Figure 1, the alternating current supply line comprising conductors 1 and 1', shown as a branch of a main line represented by conductors 2 and 2', is arranged to energize a suitable load, for example, the primary winding 3 of a transformer 4. The latter may be of the type used for welding purposes wherein considerable power is expended and the primary winding carries also heavy currents. The control system in accordance with this invention is particularly applicable to arrangements above specified, consequently in describing the invention, a transformer load was chosen as the best illustrative example. For the sake of simplicity, the utilizing circuit for the currents delivered by the secondary winding is omitted, inasmuch as this may be used for manifold applications and has no bearing on the control system.

In continuing the description of Fig. 1, it is seen that between one terminal of the load 4 and one conductor of the line is interposed a pair of ignitron rectifiers 6 and 6', each having an anode 7, a cathode 8 and a make-alive electrode 9, the corresponding electrodes of the rectifier 6' being marked with identical reference characters bearing primary indices. The two rectifiers 6 and 6' are interconnected in opposite relation of conductivity, that is, the anode 7 by means of conductor 10 to the cathode 8' and the cathode 8 by means of conductor 11 to the anode 7'. The former connection terminating at the conductor 1' of the supply line and the latter at one terminal of the primary winding 3, the other of which being directly connected to conductor 1 of the line. In this manner the rectifiers must carry all the currents supplied by the line to the load when in a conductive state, or form an obstructing medium when in a non-conductive state.

The make-alive electrodes 9 and 9' are arranged to be directly interconnected by the conductor 12 which is broken by the switch 13.

Before describing the operation of the system, a short description of Fig. 2 is preferably made here. The circuit of the latter is identical with that of Fig. 1 in all its major details and is accordingly marked with corresponding reference characters, with the exception of an auxiliary connection between the cathode and the control electrode of each ignitron rectifier. This connection includes a unilateral conductive device of any suitable type, shown here by way of example as dry rectifiers 14 and 14', respectively, the terminals of which are so poled that the direction of conductivity is from the cathode to the make-alive electrode.

With reference to the operation of the circuit, considering either Fig. 1 or Fig. 2, it is to be noted that the rectifier tubes of the type indicated remain non-conductive until sufficient current is sent into the make-alive electrode 9 or 9', to start a cathode spot upon the respective mercury pool, and provided that the corresponding anode is also positive with respect to its cathode at the time. By the simple secondary circuit comprising the switch 13 and conductors 12 and upon closure of the former, the two make-alive electrodes 9 and 9' are conductively interconnected. In tracing this circuit further, it will be seen that a conducting path exists from terminal 1 through winding 3 of the transformer 4, into the cathode 8 of tube 6, the make-alive electrode 9, connection 12, switch 13, conductor 12', make-alive electrode 9', cathode pool 8', connection 10' to terminal 1'. When the switch 13 is closed, current will flow along this path, and when it reaches a sufficient value, a cathode spot will be started upon pool 8 or 8', depending on whether terminal 1' or 1 is momentarily positive. The starting of the cathode spot on 8 or 8' causes the tube 6 or 6' to strike, and cause all the current to flow from the main anode 7 or 7' through an arc in 6 or 6' to cathodes 8 or 8', depending on whether terminal 1' or 1 is positive. As long as the switch 13 remains closed, at one-half cycle one of the tubes 6 and 6', and at the next half cycle the other of the tubes 6 and 6' becomes conductive and current is allowed to flow through the primary winding 3 of the transformer 4. When the switch 13 is opened, the conducting connection between the starting electrodes 9 and 9' is broken, so that current for starting a cathode spot at 8 or 8' cannot flow. In this manner, current flow ceases at the termination of the particular half cycle in which the switch 13 was opened.

In the modification shown in Fig. 2, the dry rectifiers 14 are used to lessen the amount of current which passes through the ignition electrodes in the direction from the cathode to the make-alive electrode. With certain types of ignition electrodes, it is found that there is a deteriorating influence resulting from excessive flow of current from cathode to make-alive electrode. To lessen this effect, the dry rectifiers 14, 14', are installed paralleling the ignition electrodes 9 and 9', and with such polarity that they divert the current from the make-alive electrode when it flows from the cathode into the make-alive electrode, but does not divert the current from the make-alive electrode when it flows through the latter electrode into the mercury cathode.

From the foregoing it is readily seen that by the simple circuit arrangement large currents flowing in the primary circuit may be controlled with ease by manipulating the switch 13 in the secondary circuit which carries negligibly small currents.

I claim as my invention:

1. In a current control system, a primary circuit including an alternating current supply and a load therefor, a pair of rectifiers of the ignitron type, each having an anode, a cathode and a starting electrode, each rectifier connected in series between said supply and said load and said rectifiers being in opposite relation of conductivity, a secondary circuit for controlling the current flow in said primary circuit comprising said starting electrodes conductively interconnected and switching means serially interposed therebetween.

2. In a current control system, a pair of conductors forming an alternating current supply line terminating in a load circuit, a network, consisting of pair of rectifiers of the ignitron type connected back-to-back, serially interposed between one conductor of said line and said load, each said rectifier having a starting electrode, a circuit for controlling the conductance of said rectifiers comprising a conductive connection between the starting electrodes thereof and a switch interposed in said connection.

3. In a current control system, a pair of conductors forming an alternating current supply line, a load circuit having terminals, a pair of ignitron rectifiers, having anode, cathode and make-alive electrodes, a connection between the anode of one of said rectifiers and the cathode of the other of said rectifiers and one conductor of said line, another connection between the cathode of said first rectifier and the anode of said second rectifier and one terminal of said load, another terminal of said load being connected to the other conductor of said line, whereby said rectifiers are serially interposed between one conductor of said line and said load, a circuit for controlling the duration of current flow semi-cyclically alternating between said rectifiers, comprising a connection interconnecting the make-alive electrodes of said rectifiers and a switch interposed in said connection.

4. In a current control system, a pair of conductors forming an alternating current supply line, a load circuit having terminals, a pair of ignitron rectifiers, having anode, cathode and make-alive electrodes, a connection between the anode of one of said rectifiers and the cathode of the other of said rectifiers and one conductor of said line, another connection between the cathode of said first rectifier and the anode of said second rectifier and one terminal of said load, another terminal of said load being connected to the other conductor of said line, whereby said rectifiers are serially interposed between one conductor of said line and said load, a circuit for controlling the duration of current flow semi-cyclically alternating between said rectifiers, comprising a connection interconnecting the make-alive electrodes of said rectifiers and a switch interposed in said connection; and a branch circuit including a unilateral conductive device between the cathode and make-alive electrode of each of said rectifiers.

5. In a current control system, a pair of conductors forming an alternating current supply line, a load circuit having terminals, a pair of ignitron rectifiers having anode, cathode and ignitron electrodes, a connection between the anode of one of said rectifiers and the cathode of the other of said rectifiers and one conductor of said line, another connection between the cathode of said first rectifier and the anode of said second rectifier and one terminal of said load, another terminal of said load being connected to the other conductor of said line, whereby said rectifiers are serially interposed between one conductor of said line and said load, a circuit for controlling the duration of current flow semi-cyclically alternating between said rectifiers, comprising a connection interconnecting the make-alive electrodes of said rectifiers and a switch interposed in said connection; and branch circuits including a unilateral conductive device between cathode and make-alive electrodes of each of said rectifiers, said devices being so polarized as to allow back-current flow in the direction from cathode to make-alive electrode in each of said rectifiers.

6. In a current control system, an alternating current supply, a load circuit, a pair of ignitron rectifiers each having a cathode and a make-alive electrode, interposed in anti-parallel between said supply and said load, and a conductive connection between said supply and said circuit including in series the make-alive and cathode electrodes of said rectifiers.

7. For use in controlling the supply of power from a source the combination comprising an electric discharge device of the immersed ignition electrode type having a cathode and an ignition electrode in contact with said cathode, means for interconnecting said source and said ignition electrode and cathode and asymmetrically conductive means exclusive of said interconnecting means shunting said ignition electrode and cathode.

8. For use in supplying a load from a source of alternating current, the combination comprising a pair of electric discharge devices of the immersed-ignition-electrode type each including an anode, a cathode and a control electrode interposed in anti-parallel between said source and said load and means for establishing a single conductive connection between said source and said control electrodes to render said devices conductive.

9. For use in controlling the supply of power from a source the combination comprising an electric discharge device of the immersed ignition electrode type having a principal electrode and an ignition electrode in contact with said principal electrode, completely metallic means for interconnecting said source and said ignition electrode and principal electrode and asymmetrically conductive means exclusive of said interconnecting means shunting said ignition electrode and principal electrode.

10. In combination with a source having output terminals, electric discharge means of the immersed ignition electrode type, comprising a pair of cathodes and an ignition electrode in each cathode, means for connecting said cathodes to opposite terminals of said source, and conductive means interconnecting said ignition electrodes.

11. The method of rendering an electric discharge device conductive at instants in the periods of a periodically pulsating source which are predeterminable at will,—said device being of the immersed-ignition-electrode type having a plurality of principal electrodes and a predetermined critical potential drop being required across said ignition electrode to render said device conductive, which comprises the steps of impressing a potential from said source between the principal electrodes of said device which is of sufficient magnitude to maintain a discharge therebetween after it has once been initiated, impressing a periodically pulsating potential across said ignition electrode which, during each of the periods of said source, has a maximum rate of increase with respect to time that is of the same order of magnitude as that of a hypothetical potential having the same wave form as that of said source and having the same frequency and amplitude as said potential impressed across said ignition electrode, and so setting the amplitude of the potential impressed across said ignition electrode that said device is rendered conductive at said instants.

12. For use in supplying current intermittently from a source of alternating current to a load having a substantial power factor angle that is deleteriously affected by a transient produced by the initiation of current flow through said load early in the half periods of said source, the combination comprising means for connecting one terminal of said load to one terminal of said source, a first electric discharge path of the immersed-ignition-electrode type having in effect an anode, a cathode and a control electrode immersed in said cathode, means for connecting said anode to the other terminal of said source, means for connecting said cathode to the other terminal of said load, a second electric discharge path of the immersed-ignition-electrode type having in effect an anode, a cathode, and a control electrode immersed in said cathode, means for connecting the last said anode to said other terminal of said load and said last-named cathode to said other terminal of said source, and means for directly connecting said control electrodes, said discharge paths being of a type such that the drop in potential across said control electrodes required for rendering one of said paths conductive is equal to the instantaneous magnitude of said source of potential at an angle in the cycle of said source that is of the same order of magnitude as said power factor angle.

JOSEPH SLEPIAN.